United States Patent [19]

Dorival et al.

[11] Patent Number: 4,729,055

[45] Date of Patent: Mar. 1, 1988

[54] SURGE PROTECTION ELEMENT FOR TELEPHONE LINES, OR DATA TRANSMISSION LINES OR THE LIKE

[75] Inventors: Michel Dorival, Orsay; Christian Macanda, Issy les Moulineaux, both of France

[73] Assignee: Compagnie Industrielle de Tubes et Lampes Electriques Citel, Issy les Moulineaux, France

[21] Appl. No.: 61,301

[22] Filed: Jun. 12, 1987

[30] Foreign Application Priority Data

Jun. 18, 1986 [FR] France ................... 86 08786

[51] Int. Cl.[4] .............................................. H02H 9/00
[52] U.S. Cl. ......................................... 361/119; 361/120
[58] Field of Search ............... 361/119, 118, 129, 128, 361/127, 126, 129, 130, 117, 56, 58; 337/29; 379/412

[56] References Cited

U.S. PATENT DOCUMENTS

| | | | |
|---|---|---|---|
| 4,262,317 | 4/1981 | Baumbach | 361/119 X |
| 4,314,304 | 2/1982 | Baumbach | 361/119 X |
| 4,424,546 | 1/1984 | Smith | 361/119 |

FOREIGN PATENT DOCUMENTS 0017337 10/1980 European Pat. Off. .
2542938 9/1984 France .
2574589 6/1986 France .

OTHER PUBLICATIONS

J.T.R. Japan Telecommunications Review, vol. 27, No. 1, Jan. 1985, pp. 30-33, Shunzo Morishita.

*Primary Examiner*—A. D. Pellinen
*Assistant Examiner*—Todd E. DeBoer
*Attorney, Agent, or Firm*—Cushman, Darby & Cushman

[57] ABSTRACT

The surge protection element comprises an inert gas-filled protective device with electrodes inserted between two line input terminals, these terminals being connected respectively to branch terminals of an installation to be protected. The surge protection element also comprises initial protection apparatus, intended to be inserted between the terminals of the installation to be protected, and having a response time and a voltage threshold below that of said protective device, and also decoupling apparatus connected in series between the terminals of the protective device and those of the initial protection apparatus. The decoupling apparatus are capable of causing the voltage to rise at the terminals of the protective device when the current strength passing through the initial protection means increases, whereby the protective device can be tripped and can take over from the initial protection apparatus.

17 Claims, 16 Drawing Figures

SURGE PROTECTION ELEMENT FOR TELEPHONE LINES, OR DATA TRANSMISSION LINES OR THE LIKE

FIELD OF THE INVENTION

The invention relates to a surge protection element for telephone lines, or data transmission lines, or similar. The element is of the kind comprising (a) a protective device, in particular with electrodes, connected between two input line terminals which are respectively connected to branch terminals of an installation to be protected, and (b) initial protection means intended to be connected between the terminals of the installation to be protected and decoupling means connected in series between the terminals of the protective device and those of the initial protection means. The protective device is formed by a kind of cartridge comprising an external shell, intended to be earthed, and two electrodes. The surge protection element comprises a cradle fitted on a base provided with pins, this cradle comprising two lateral tongues for providing electrical connection between one electrode of the protective device and one pin of the base.

PRIOR ART

A surge protection element of this type is known, in particular from EP-A-0 017 337. However, solutions proposed to date for mounting the decoupling means and the initial protection means are relatively bulky and complicated. Moreover, it is desirable to be able to instal such decoupling means and initial protection means on an already existing surge protection element at a minimum conversion price.

OBJECTION OF THE INVENTION

It is a primary object of the invention to provide a surge protection element of the kind defined above, which would meet the various practical requirements better than heretofore and which would, in particular, be more compact of simpler design, and easy to adapt or modify, whilst having a short response time and a low tripping threshold.

SUMMARY OF THE INVENTION

According to the invention, a surge protection element of the kind defined above, is characterised in that the decoupling means and the initial protection means are mounted on a laminar substrate and that the substrate is inserted between the lateral tongues.

Each lateral strip may comprise supporting means for holding the substrate in position. These supporting means may comprise on each lateral tongue, a ledge and a rib provided at a distance from the ledge, slightly exceeding the thickness of the substrate which is thus held in position on either side of its median plane.

Each lateral tongue may comprise, for its electrical connection to the installation, a connecting terminal capable of being broken, of necessary, and means for establishing the electrical connections during the mounting of the substrate. The electrical connection means may be constituted by a bridge connector.

The means for establishing the electrical connections during the mounting of the substrate can comprise tabs capable of being bent down against a zone of the associated substrate to establlsh the electrical connection. The decoupling means are advantageously constituted by resistors serigraphically printed on the substrate which supports one or several diodes forming the initial protection means.

The diodes constituting these initial protection means may be disposed along a bride whereof the ends of one diagonal are connected respectively to the terminals of the installation to be protected and the other diagonal comprises at least one diode. The diodes used may be fast low capacitance diodes (for example of the order of 20 picofarads). Since the diodes are disposed in series, the equivalent stray capacitance is less than the capacitance of a single diode, which is favourable for high frequency use.

The serigraphically printed resistors can extend along a rectangular surface, and can be in electrical connection with conductive zones along their larger sides, whilst there may be a central conductive band on the plate substantially at midlength and along a direction orthogonal to the larger dimension of the plate; another conductive band may be provided at the edge of a larger side of the plate, the various conductive zones or bands not being in direct electrical connection with each other.

When the initial protection means are of the bipolar type, they can be orientated substantially parallel to a larger side of the substrate and be connected to two of the above-mentioned zones.

When the initial protection means are of the tripolar type, they can be orientated substantially orthogonal to a larger dimension of the substrate and may comprise three diodes connected between on the one hand the conductive band provided on the edge of one larger side and on the other hand two zones and the central conductive band which band may be connected to earth or to the frame.

The median plane of the substrate between the lateral tongues is substantially orthogonal to the pins of the base and is situated near this base. The substrate is thus placed between the base and the cartridge forming the protective device.

Generally a central tongue on the support may be earthed and may come into electrical contact with the shell of the cartridge of the protective device.

The cartridge can be mounted with its axis substantially parallel to the support in which case said cartridge becomes inserted between the lateral tongues which are in contact with the electrodes. Each lateral tongue may comprise, on its transverse edge remote from the base, a slot intended to receive the end of the electrodes of the protective device.

In accordance with a variant, a strip may be cut out in each lateral tongue and be bent down to make it possible to mount the cartridge of the protective device between these strips, with its axis substantially orthogonal to the median plane of the base and therefore substantially parallel to the pins, the lateral tongues ensuring the electrical connection between one electrode and one pin, the said lateral tongues being electrically insulated from the cartridge shell.

The invention also provides a hybrid circuit for a surge protection element such as defined above, this hybrid circuit comprising a substrate, in particular a ceramic substrate, in the form of a plate thereon the decoupling means and the initial protection means are mounted, this substrate being capable of being inserted in the support of the protective device between the lateral tongues thereof.

BRIEF DESCRIPTION OF THE DRAWINGS

Apart from the arrangements set out above, the invention consists of certain other features which will be discussed in greater detail below in connection with particular embodiments described with reference to the accompanying drawings but which area in no way restrictive. In these drawings.

DESCRIPTION OF THE PREFERRED EMBODIMENTS

Figure 1:
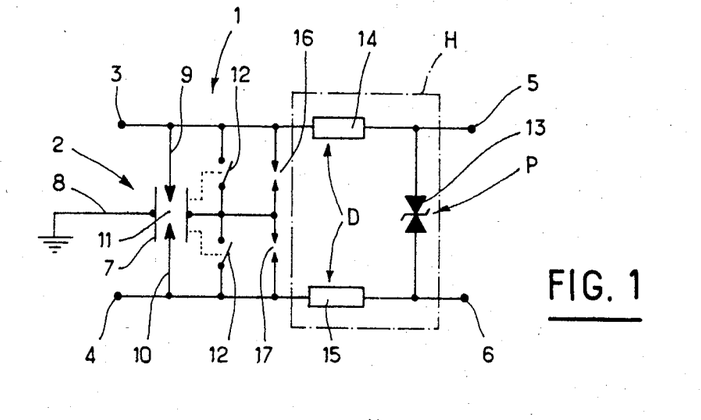
FIG. 1 is an electrical circuit diagram of a surge protection element in accordance with the invention, provided with bipolar type initial protection means.

FIG. 1 of the drawings shows the circuit diagram of a surge protection element 1 for a telephone line or a data transmission line or similar.

This protection element 1 comprises an inert gas protective device 2 or surge arrester. The protective device 2 represented in FIG. 1 is of the inert gas tripolar type, with external short circuiting and a secondary spark gap. This device 2 is connected between two terminals or pins 3, 4 intended to be connected to the line input terminals. Provision is made for two pins 5, 6 to be connected to the branch terminals of an installation to be protected (not represented).

The device 2 is formed by a kind of cylindrical cartridge which comprises an external shell 7, generally metallic, connected to an earthing pin 8. The device 2 comprises, moreover, two electrodes 9, 10, generally coaxial with the shell 7 and situated as extension one of the other. The electrodes 9 and 10 are electrically insulated from the shell 7 and are connected to pins 3 and 4 respectively. A space 11 exists between those ends of the electrodes 9 and 10 which are within the shell 7. This shell is closed in a leak-proof manner to maintain an inert gas at low pressure within the said shell 7. In the case of a voltage surge, an arc can occur between the electrodes 9 and 10, or between one of these electrodes 9, 10 and the earthed shell 7, with the passing of a relatively high current.

Each end of the shell 7 may include an overheating protection device 12 represented in outline only in FIG. 1. This device 12 can be of the type described and claimed in French Patent Application No. 2 574 589 filed on the 12 Dec. 1984. In the case of overheating, such a device 12 establishes a short circuit between the earthed shell 7 and one of the electrodes by way of fusion of a fusible element. This device 12 has been represented schematically in FIG. 1 by means of a broken dotted line and an open contact between line 3 or line 4 and the shell 7. This contact may be considered to be closed when short circuiting occurs by fusion in the vicinity of the device 12.

In a protective device 2 of the inert gas type, the arcing voltage between the electrodes, or between one electrode and the earthed shell, in of the order of about one hundred volts or more; it can each 250 V. When the arc is struck, the protective device 2 is capable of absorbing a high current strength.

So as to have a lower tripping voltage threshold, the element 1 comprises initial protection means P inserted between the terminals 5, 6 which are intended to be connected to those of the installation to be protected. These means P have a voltage response threshold below that of the device 2. In the example of FIG. 1, the means P are advantageously constituted by a double Zener diode 13. According to the type of diode chosen, the trip voltage can vary within wide limits; for example it may lie between 5 volts and 170 volts.

A Zener clipping double diode to be used as diode 13 has a relatively large capacitance, of the order of 1 nanofarad.

The decoupling means D are connected in series between the terminals of the protective device 2 and those of the initial protection means P. These decoupling means are generally constituted by electric resistors 14, 15. It would, however, be possible to use other components, for example, inductors. By way of a non-restrictive, numerical example, each resistor 14, 15 can have a value of 10 ohms and can withstand a transient surge of the order of 1,000 V.

The unit of the circuit formed by the initial protection means P and the decoupling means D will, in the remaining part of the description, be designated by the term "hybrid circuit" H; this circuit is given an imaginary identity in FIG. 1 by a rectangular frame in dots and dashes.

The decoupling means D are capable of causing the voltage to rise at the terminals of the protective device 2 when the current strength passing through the protective means P increases, so that the protective device 2 could start to operate and take over from the means P.

In this case of the resistors 14, 15 under consideration, it will immediately be seen that when the diode 13 is in the clipping mode, the potential difference between the electrodes 9 and 10 of the device 2 while this device 2 has not been tripped, is equal to the voltage drop through the resistor 14, the diode 13 and the resistor 15. This voltage drop varies in the same way as the current strength.

A secondary spark gap 16, 17, one design of which will be described in greater detail below, can be provided between the shell 7 and the part of the electrodes 9 and 10 situated outside the said shell. Preferably, the secondary spark gap 16, 17 is arranged so as to have a tripping value of approximately 1,000 volts, and is intended to make up for any failure of the device 2.

Figure 2:
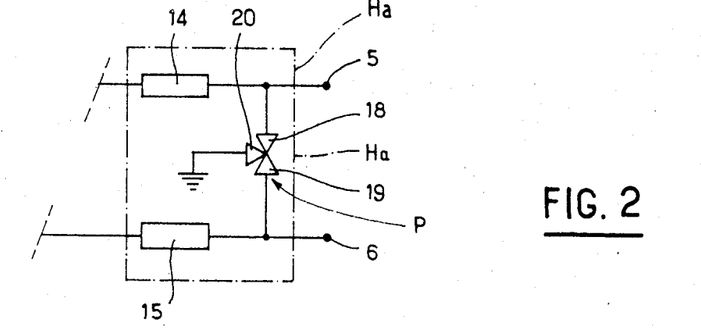
FIG. 2 is a circuit diagram of tripolar type initial protection means.

The circuit diagram of FIG. 2 corresponds to a hybrid circuit Ha, wherein the initial protection means P are of the tripolar type and comprise three diodes 18, 19, 20, for example, diodes known under the trade name of "TRANSIL" whose cathodes are connected to a common point and whose anodes are connected respectively to the terminals 5, 6 and earth. The decoupling means D of the hybrid circuit Ha remain constituted by the resistors 14, 15.

Figure 3:
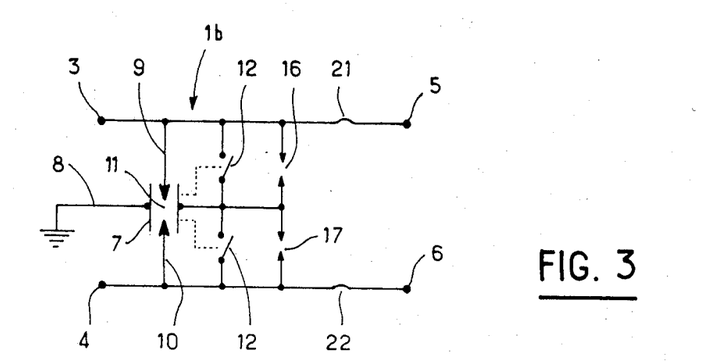
FIG. 3 is a circuit diagram of a protective element without the initial protection means and the decoupling means.

FIG. 3 is a circuit diagram of a protection element 1b without the hybrid circuit H or Ha, but arranged in such a way that it can be easily converted into a surge protection element such as the element 1 of FIG. 1.

The parts of the element 1b which are identical with the parts already described with reference to FIG. 1, are designated by the same reference numerals or letters. The electrical connection between the terminals 5 and 6 and those of the protective device 2 is ensured by a bridge connector 21 or 22 which can be cut or broken when the hybrid circuit Ha is to be inserted, as will be explained below.

Preferably, the decoupling means D and the initial protection means P are mounted on a substrate S (see in particular FIGS. 6 and 7), in particular a ceramic substrate generally constituted by a plate 23, in this case rectangular in shape.

In the case where the decoupling means D are formed by resistors 14, 15, these resistors are advantageously printed serigraphically (see FIGS. 6 and 7) and extend along a rectangular surface. The resistor 14 (see FIG. 6) is in electrical connection along one of its larger sides, with a conductive zone 24; the other opposed side of the resistor 14 is in electrical connection with an electrically conductive zone 25. Similarly, the serigraphically printed resistor 15 is in electrical connection along its two opposed larger sides with conductive zones 26, 27.

Figure 6:
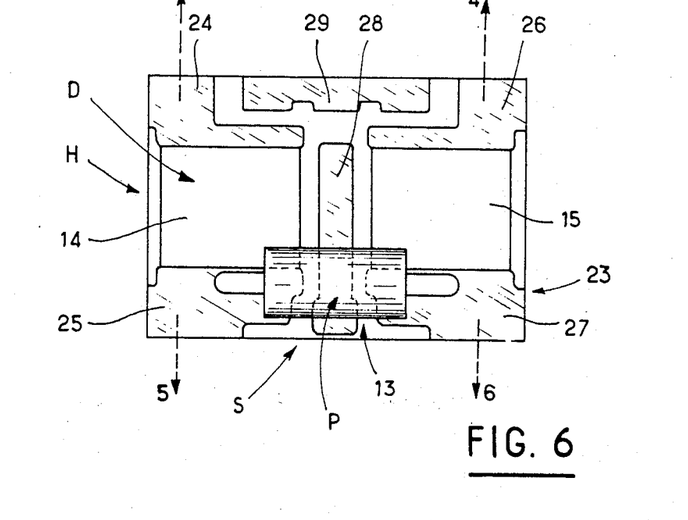
FIG. 6 is a plan view of a substrate supporting the initial protection means and the decoupling means formed by serigraphically printed resistors for a bipolar version.

A central conductive band 28 is provided on the plate 23 substantially at midlength and following a direction orthogonal to the larger dimension of the plate 23. Another conductive band 29 is provided at the edge of one larger side of the plate 23; the various conductive zones or bands 24 to 29 are not in direct electrical connection with each other. The zones 24 and 26 are intended to be electrically connected to the terminals 3 and 4 represented in FIG. 1, whilst the zones 25 and 27 are intended to be electrically connected to the terminals 5 and 6 schematically outlined in FIG. 1. The initial protection means P formed by the double Zener diode 13 are, in the case of the hybrid circuit H whose embodiment is represented in FIG. 6, fixed on the plate 23, the electrodes of the diode 13 being electrically connected in particular by soldering, to the zones 25 and 27. The electrodes of the diode 13 are, in the case of FIG. 6, orientated substantially parallel to the larger sides of the plate 23.

Figure 7:
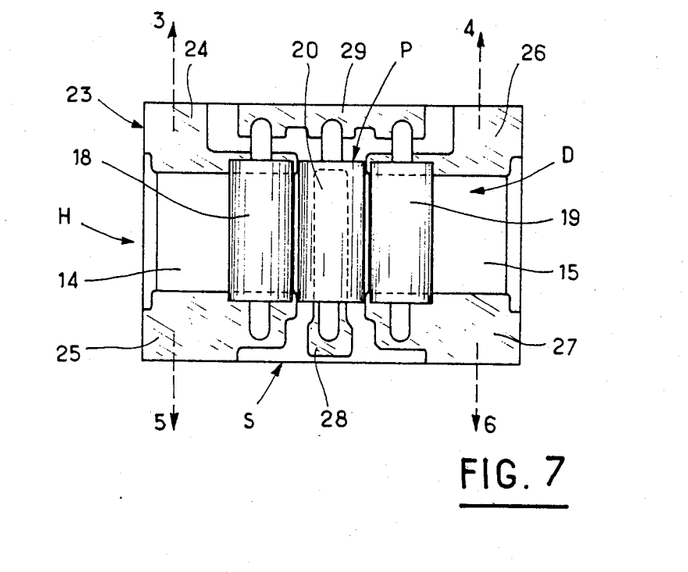
FIG. 7 is a plan view of a substrate carrying the initial protection means and the decoupling means for a tripolar version.

FIG. 7 illustrates the embodiment of the hybrid circuit Ha of FIG. 2. The same plate 23 and the same serigraphically printed resistors and conductive zones or bands, as those described with reference to FIG. 6, are again used. These parts are designated by the same reference numerals without a repetition of their description. The initial protection means P, formed by the three diodes 18, 19, 20 already described, are disposed in such a way that the electrodes of these diodes should be orientated substantially orthogonal to the larger dimension of the plate 23. The cathodes of these diodes are all electrically connected to the conductive band 29. The anode of the diode 18 is connected to the zone 25, in particular by soldering, whilst the anode of the diode 19 is connected to the zone 27. The anode of the diode 20 is electrically connected to the conductive band 28 which is itself connected to earth or the frame.

The substrate S, such as shown in FIG. 6 or 7, is capable of being inserted in a support 30 (see FIGS. 4 and 5) of the protective device 2, without the need for any substantial modification.

Figure 4:
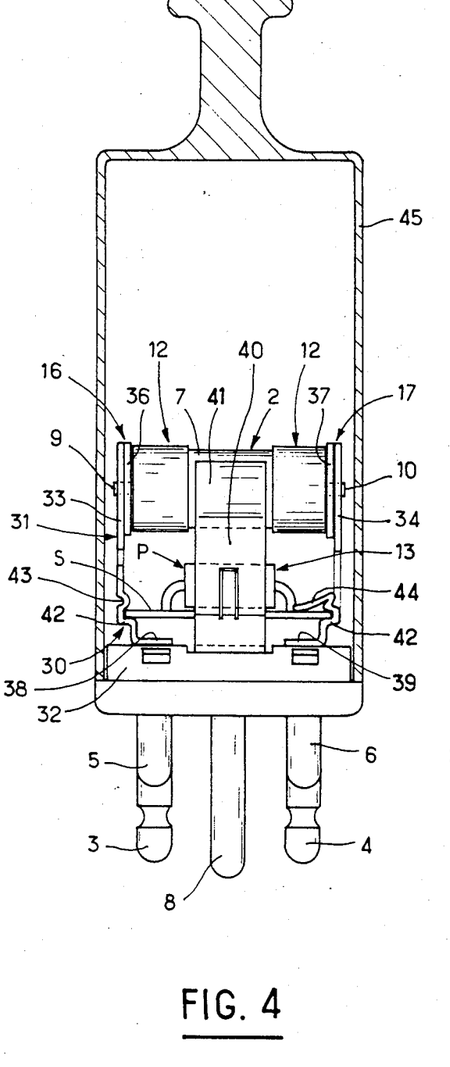
FIG. 4 is a view in elevation, with parts shown in cross-section, of an embodiment of a surge protection element according to the invention.
Figure 5:
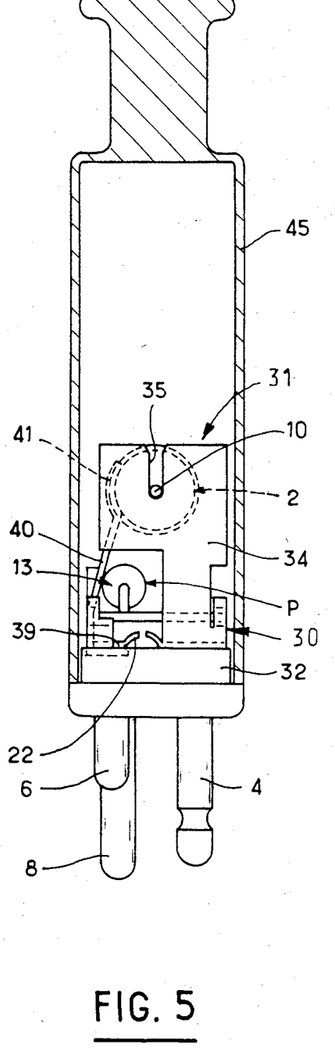
FIG. 5 is a view from the right in relation to FIG. 4.

The support 30 comprises a cradle 31 mounted on an electrically insulating base 32 provided for receiving a protective device 2 in the form of a cylindrical cartridge. The cradle 31 comprises two lateral tongues 33, 34 between which the cartridge of the device 2 is inserted. These lateral tongues 33, 34 are metallic and effect electrical connection between one electrode 9 10 of the device 2 and one pin 3, 4.

Each tongue 33, 34, whose shape is clearly visible in FIG. 5, comprises in its upper portion a slot 35 intended to receive the end of one electrode of the device 2.

A washer 36, 37 (FIG. 4) made of a plastic insulating material, in particular a polyimide, having at least one hole and preferably several holes therein, is provided between the internal face of a respective one of the tongues and the adjacent end face of the protective device 2. The shell 7 is thus electrically insulated from the tongues 33, 34 and therefore the terminals 3 and 4. These washers 36, 37 make it possible to create the secondary spark gaps 16, 17 previously referred to. The thickness of each washer 36, 37 is of the order of 65 microns when this washer is made of polyimide so that the tripping value of the spark gap is approximately 1,000 volts.

Each tongue 33, 34 is substantially in the form of an up-ended L, as may be seen in FIG. 5. The bottom of each tongue is fixed on the insulating base 32 and is permanently connected to one of the pins 3 or 4. The bottom of each tongue 33 or 34 is moreover connected, by the bridge connector 21 or 22 previously referred to with reference to FIG. 3, to a plate 38, 39 fixed on the base 32 and is permanently connected electrically to the pins 5 and 6.

In FIGS. 4 and 5, the bridge connectors 21, 22 are broken because a hybrid circuit H mounted on a substrate S has been inserted in the support 30.

A central tongue 40 connected to an earthing pin 8 is fixed on the base 32 and extends, slightly slantingly (see FIG. 5), towards the device 2. The end 41 of this tongue remote from the base 32, has a concave shape with the cross-section of a circular arc, capable of bearing against the metallic cylindrical surface of the shell 7. The tongue 40 is disposed so as to exert slight pressure on the shell 7 with its end 41 in order to establish an electrical contact completed by soldering thereby earthing the shell 7.

Each lateral tongue 33, 34 comprises supporting means for the substrate S preferably constituted by ribs or ledges 42 (see FIG. 4) holding in position the substrate S which has been inserted slidingly between these lateral tongues 33, 34. There may be an inwardly projecting rib 43 on each tongue 33, 34 at a distance from the ledge 42 slightly exceeding the thickness of the substrate S, which substrate is thus held in position on either side of its median plane.

As may be seen in FIGS. 4 and 5, the ledges 42 are situated near the base 32, and the substrate S is disposed with its median plane substantially parallel to the base 32 and othogonal to the pins 3, 4, 5, 6. The substrate S and the means B are situated between the base 32 and the shell 7.

The insertion of the substrate S between the tongues 33, 34 is effected by sliding along a direction perpendicular to the plane of FIG. 4, that is to say, along a direction situated in a plane parallel to the tongues 33, 34 and orthogonal to the pins 3, 4, 5, 6.

The electrical connection means between, on the one hand, the lateral tongues 33, 34 and the plates 38, 39 and, on the other hand, the zones 24, 26 and the zones 25, 27 of the substrate S are preferably constituted by tabs such as 44 (FIG. 4) cut out in the tongues 33, 34 or in the corresponding plates 38, 39, each tab such as 44 being capable of being bent against the associated zone of the substrate S to establish the electrical connection and possibly contributing to the mechanical hold of the substrate.

A detachable cover 45, made in particular of an insulating plastic material, may be fixed, in particular by catch-engagement, on the base 32 and covering the element as a whole.

Figure 8:
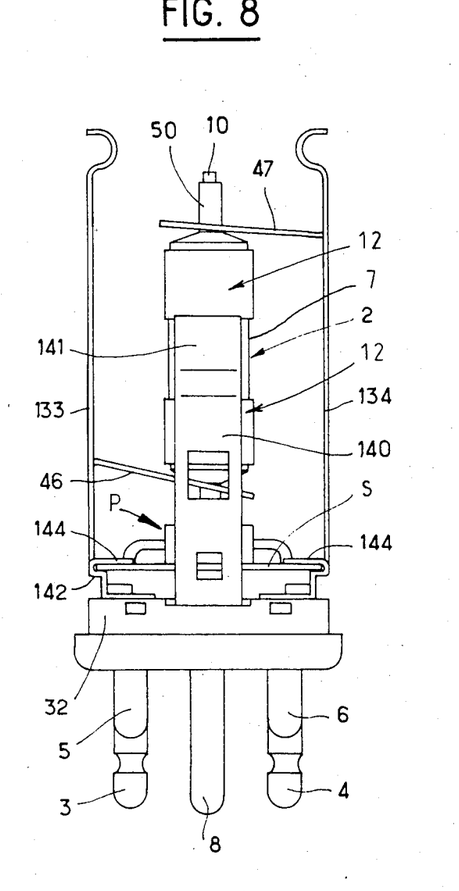
FIG. 8 is similar to FIG. 4 and shows a variant.
Figure 9:
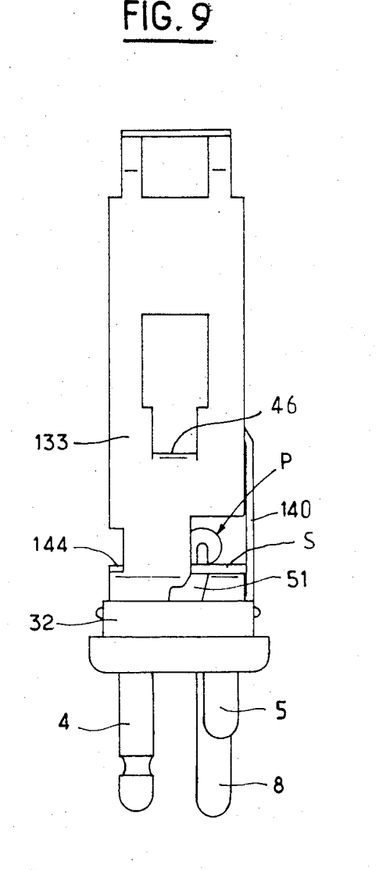
FIG. 9 is a view from the left side of FIG. 8.

FIGS. 8 and 9 show a variant of the embodiment of the support of FIGS. 4 and 5 for the protective device 2. Those elements which are identical or which perform functions similar to elements already described with reference to FIGS. 4 and 5 are designated either by the same reference numerals or by the reference numeral used in FIGS. 4 and 5 for designating the corresponding element increased by 100. The description of these elements will not be repeated or will be only succinctly repeated.

In the case of FIGS. 4 and 5, the protective device 2 is disposed with its axis parallel to the median plane of the base 32, this axis being orthogonal to the lateral tongues 33, 34.

In FIGS. 8 and 9, the protective device 2 is disposed with its axis orthogonal to the median plane of the base 32, substantially at the centre of this base. The axis of the device 2 is parallel to the lateral tongues 133, 134 which extend upwardly on the opposite side to the base 32 over a length which is clearly greater than that of FIGS. 4 and 5. A strip 46 of substantially rectangular shape is cut out along three sides in the tongue 133 to which it is attached at its small lower side. This strip 46 is bent down towards the support 32 in the space comprised between the tongues 133, and 134. This strip 46 is, as may be seen in FIG. 8, slightly slanting from the tongue 133 towards the base 32.

Another strip 47, similar to the strip 46, is cut out in the tongue 134 to which it remains attached at its small upper side. This strip 47 is folded upwards from the tongue 134 in the space comprised between the two tongues. Towards the end of each strip 46, 47 remote from the corresponding tongue 133, 134, is a cut out 48 (FIG. 10) opening out at one longitudinal edge of the strip 47, this cut out 48 being substantially midway from the tongues 133, and 134. The cut out is advantageously obtained by cutting out, along two parallel edges 49 orthogonal to the longitudinal median direction of the strip 47, a band 50 which is bent back, substantially at right angles towards the side remote from the space between the strips 46, and 47. The band 50 of the upper strip 47 is thus bent upwards, whilst the corresponding band of the lower strip 46 is bent downwards.

Figure 10:
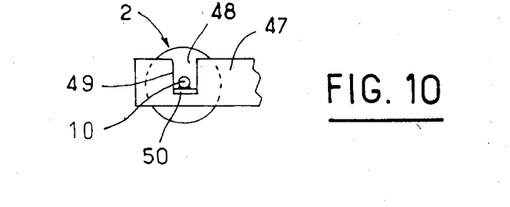
FIG. 10 is a top view of a detail of FIG. 8.

The electrodes 9 and 10 of the device 2 are engaged in the cut outs 48 and are applied against the respective bands 50 to which they are soldered.

The central tongue 140 connected to the earthing pin 8 and fixed to the base 32 exerts slight pressure on the shell 7 with its curved end 141 to establish the electrical earthing contact.

On each lateral tongue 133, 134, there are again ribs or ledges 142 to hold the substrate S in position. The bent down tabs such as 144, in particular cut out of the tongues 133, 134, allow the substrate S to be held in position and establish the electrical connections with the zones 24, 26, and 25, 27 of this substrate.

The component equivalent of the bridge connector 21 or 22 of FIGS. 4 and 5 has been withdrawn in FIG. 9 and leaves a remaining free space 51, establishing an electrical break.

Figure 11:
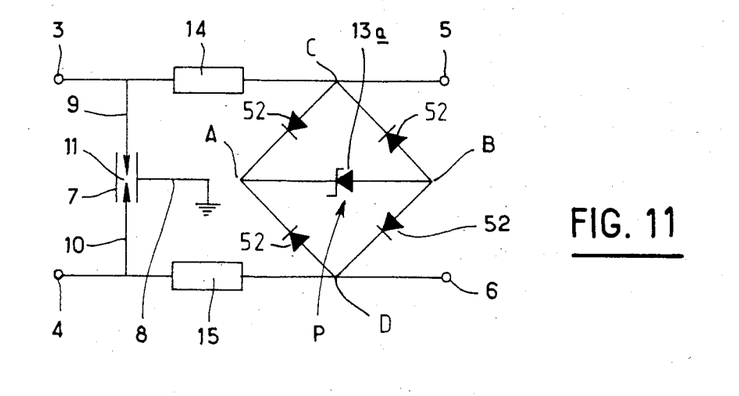
FIG. 11 is a circuit diagram of a variant of the surge protection element of FIG. 1 of the bipolar type.

FIG. 11 shows a circuit diagram of a variant of the design of a bipolar protective device, similar to the circuit diagram of FIG. 1. Those elements which are identical have been designated by the same reference numerals as those used for FIG. 8 without a repetition of their description. For the sake of simplification the overheating protection device 12 represented in FIG. 1 has not been repeated in FIG. 11, although such a device may, of course, be included. The same applies to the secondary spark gap 16, 17 of FIG. 1, which is not shown in FIG. 11.

In FIG. 11 the double Zener diode 13 of FIG. 1 has been replaced by a single Zener diode 13a in one diagonal A, B of a diode bridge 52. The ends C, D of the other diagonal of this bridge are connected to the terminals 5 and 6. Diodes 52 are disposed on the sides of the bridge in such a way that the simple Zener diode 13a can operate on the Zener principle irrespective as to whether the terminal 5 is brought to a higher potential than that of the terminal 6, or vice versa. The point C connected to the terminal 5 is also connected on the one hand to the anode of a diode 52 whose cathode is connected to the point C, and on the other hand to the cathode of a diode 52 those anode is connected to the point B. The cathode of the Zener diode 13a is connected to point A, and the anode to point B. The point D is connected on the one hand to the anode of a diode 52 whose cathode is connected to A, and on the other hand to the cathode of a diode 52 whose anode is connected to B.

The diodes 52 are fast switching diodes, whilst the diode 13a is a fast clipping diode.

The circuit diagram of FIG. 11 corresponds to a bipolar low capacitance protection whose applications may concern communications with high flow rates such as a local network, or a digital network with integrated services. The operating frequency is normally below, or equal to, 20 MHz. The attenuation at 10 MHz is less than 1 dB.

The fast diodes used, in particular the diodes 52, have a low capacitance of the order of 20 picofarads. Mounting the diodes and hence their capacitances in series, leads to a lower image capacitance than that of each diode in series.

Figure 12:
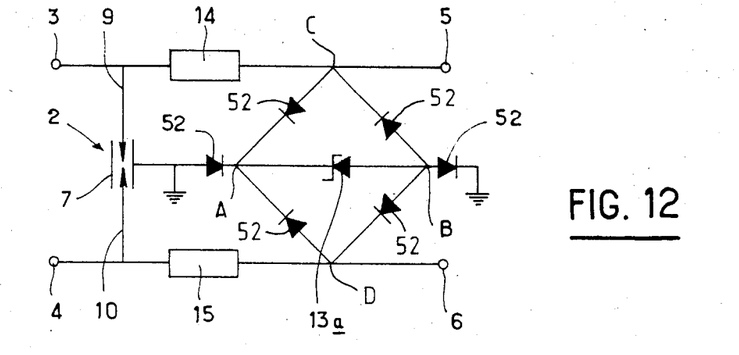
FIGS. 12 to 16 are circuit diagrams of variants of the surge protection elements of the tripolar type.

The circuit diagram of FIG. 12 is a tripolar low capacitance circuit diagram, derived from that of FIG. 11 by the addition of two diodes 52 provided respectively between earth and each end of the diagonal wherein the single Zener diode 13a is mounted.

The end of the diagonal connected to the cathode of the Zener diode 13a is also connected to the cathode of a diode 52 whose anode is earthed.

The other end of the diagonal connected to the anode of the Zener diode 13a is also connected to the anode of a diode 52 whose cathode is earthed.

The circuit diagram of FIG. 12 can be used for the same applications as those set out with reference to FIG. 11 with a similar frequency and attenuation.

Figure 13:
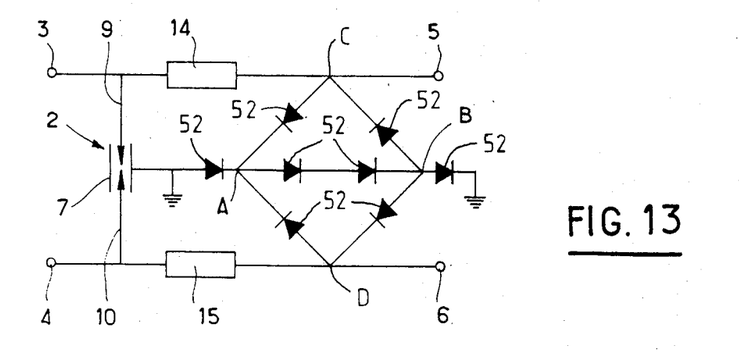

The circuit diagram of FIG. 13 corresponds to a tripolar low capacitance and low voltage protective layout.

It is derived from the circuit diagram of FIG. 12 by replacing the Zener diode 13a by two fast switching diodes 52, connected in series in the diagonal of the bridge. One of these diodes 52 has its cathode connected to the end B of the diagonal. This end B is connected to the anode of the other diode 52 which is earthed.

The end A of the diagonal is connected to the anode of the second diode 52 of the diagonal.

Irrespective of the sign of the potential difference between C and D, there always exists a conductive path from C to D or vice versa, through four diodes 52 in series. The maximum voltage between C and D is, therefore, of the order of four times the voltage drop in one diode 52; this voltage drop being of the order of 0.6 volts per diode, the maximum voltage between C and D is of the order of 2.4 volts.

A protective circuit in accordance with the diagram of FIG. 13 can be used for a local network with an operating frequency below, or equal to 20 MHz. The attenuation at 10 MHz is less than 1 dB.

Figure 14:
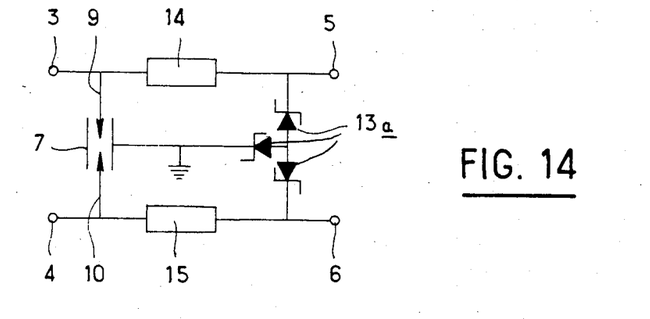

The circuit diagram of FIG. 14 is a variant of that of FIG. 2 with a view to obtaining enhanced protection, in particular for data transmission. Three fast clipping Zener diodes 13a have their anodes connected to a common point. The cathode of one diode 13a is connected to the terminal 5; the cathode of another diode 13a is connected to the terminal 6; the cathode of the remaining diode 13a is earthed.

Figure 15:
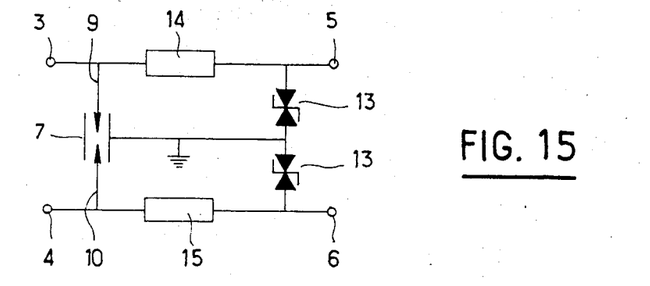

The circuit diagram of FIG. 15 corresponds to a joint mode protection; two double Zener diodes 13 are connected in series between the terminals 5 and 6. A midpoint between the two Zener diodes 13 is earthed. Such a lay-out is particularly suitable for an RS232C/V24 connection.

Figure 16:
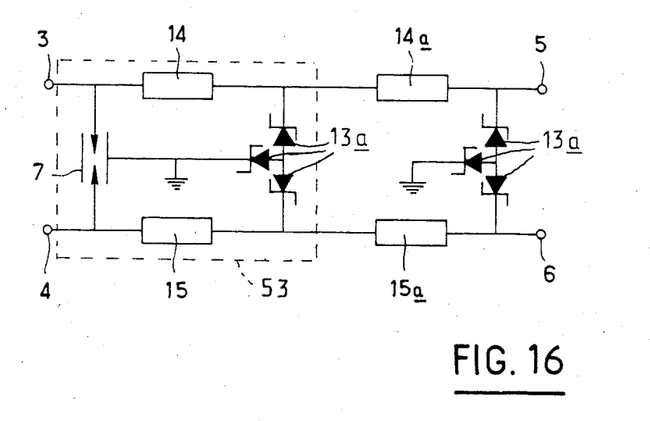

Finally, the circuit diagram of FIG. 16 corresponds to an enhanced low voltage protection, in particular for a transmission at a very low level.

This lay-out consists of a first portion 53, similar to the lay-out of FIG. 14. The cathode of the diode 13a in the line coming from the resistor 14 is also connected to one terminal of an adiitional resistor 14a similar to the resistor 14.

The cathode of the diode 13a in the line comprising the resistor 15 is also connected to the terminal of an additional resistor 15a, similar to the resistor 15.

The second terminal of tha additional resistor 14a is connected to the output terminal, whilst the other terminal of the additional resistor 15a is connected to the outlet terminal 6.

Between the two output terminals 5 and 6 and earth, there are inserted three fast clipping Zener diodes 13a just as in FIG. 14.

With a device using the circuit diagram of FIG. 16, the maximum line voltage may be established at 0.8 Volt.

In the case of the three lay-outs of FIGS. 14, 15 and 16, the maximum operating frequencies are of the order of 100 KHz; the attenuation at 20 KHz is less than 0.1 dB.

Irrespective of the embodiment adopted, the resulting protection element in accordance with the invention allows the protection of the installations to be improved.

The hybrid circuit forming part of such a surge protection element is simple to manufacture and can be easily installed, even on an element not initially provided with it.

It is possible to manufacture separately on the one hand, the surge protection elements of the conventional type comprising only the protective device with inert gas and electrodes, and on the other hand the subassembly constituted by the substrate comprising the initial protection means and the decoupling means. If required, one may then convert the conventional type of surge protection element by means of a very simple and rapid operation into a surge protection element in accordance with the invention comprising the initial protection means. There follow therefrom economies of manufacture and scope for converting a conventional surge protection element in a simple manner into an element in accordance with the invention by the simple insertion of the equipped substrate.

We claim:

1. In a surge protection element for telephone lines or data transmission lines of the like, comprising:
    (a) an inert gas filled protective device having first and second electrodes connected between first and second line input terminals;
    (b) means connecting said first and second line input terminals to respective branch terminals of an installation to be protected;
    (c) initial protection means having first and second terminals adapted to be connected between said terminals of the installation to be protected; and
    (d) decoupling means connected in series between said first and second line input terminals of said gas-filled protective device and said first and second terminals of the initial protection means;
    wherein said protective device is formed by cartridge means comprising (i) an external shell adapted to be earthed, and (ii) two electrodes, said protection element further comprising a cradle mounted on a base provided with pins, said cradle comprising two lateral tongues to provide electrical connection between said first electrode of the protective device and a said pin;
    the improvement comprising:
    (e) laminar substrate means carrying said decoupling means and said initial protection means, said laminar substrate means being positioned between said lateral tongues.

2. A surge protection element according to claim 1, wherein said laminar substrate means has a median plane which is substantially parallel to said base and is orthogonal to said pins.

3. A surge protection element according to claim 1, wherein each said lateral tongue comprises supporting means for holding the substrate means in position.

4. A surge protection element according to claim 3, wherein said supporting means comprise, on each said lateral tongue, a ledge and a rib spaced from said ledge by a distance slightly exceeding the thickness of the substrate means which is thus held in position on either side of its median plane.

5. A surge protection element according to claim 1, wherein said initial protection means comprise a diode bridge having the ends of one diagonal respectively connected to said terminals of the installation to be protected and having at least one diode in its other diagonal.

6. A surge protection element according to claim 5, wherein said at least one diode comprises at least one Zener diode.

7. A surge protection element according to claim 1, wherein each said lateral tongue comprises:
   (a) electrical connection means with a connecting pin to the installation, said connecting pin being adapted to be readily broken, if necessary; and
   (b) means for establishing the electrical connections during the mounting of the substrate means.

8. A surge protection element according to claim 7, wherein each said electrical connection means is constituted by a bridge connector.

9. A surge protection element according to claim 7, wherein the means for establishing the electrical connections during mounting of the substrate means comprise tabs capable of being bent down against the associated substrate means for establishing the electrical connection.

10. A surge protection element according to claim 1, wherein said initial protection means includes at least one diode; and wherein said decoupling means are constituted by resistors serigraphically printed on the substrate means which supports said at least one diode of said initial protection means.

11. A surge protection element according to claim 10, wherein the laminar substrate means is rectangular; and said serigraphically printed resistors extend along a rectangular surface thereof and are in electrical connection along their larger sides with conductive zones of said laminar substrate means; and including a first central electrically conductive band on the substrate means substantially at midlength and along a direction orthogonal to the larger dimension of the substrate means and a second electrically conductive band at the edge of a said larger side of the substrate means, said electrically conductive bands not being in direct electrical connection with each other.

12. A surge protection element according to claim 11, wherein said initial protection means are of the bipolar type, and are orientated substantially parallel to the larger sides of the substrate means and including two electrically conductive zones of said substrate means and means connecting said initial protection means to said two zones.

13. A surge protection element according to claim 11, wherein the initial protection means are of the tripolar type; wherein the substrate means includes two electrically conductive zones adapted to be connected to said terminals of the installation to be protected; and wherein the initial protection means are orientated substantially orthogonal to the larger dimension of the substrate means and comprise three diodes inserted between either said second electrically conductive band or a respective one of said two zones and said central conductive band, and including means connecting said initial electrically conductive band to one of earth and the frame of said surge protection element.

14. A surge protection element according to claim 1, wherein each said lateral tongue comprises means defining a slot on the transverse edge of said tongue remote from said base, said slot being intended to receive the end of a respective said electrode of the protective device.

15. A surge protection element according to claim 1, wherein a srip is cut out in each said lateral tongue and is bend down to allow the protective device to be mounted between said strips with its axis substantially orthogonal to the median plane of said base, the lateral tongues being adapted to effect electrical connection between one said electrode and one said pin, and said lateral tongues being electrically insulated from the shell of said cartridge means.

16. A hybrid circuit for the surge protection element according to claim 1, said surge protection element including a support for the protective device between said lateral tongues, said hybrid circuit comprising substrate means in the form of a plate whereon there are mounted said decoupling means and said initial protection means, and said plate being adapted to be inserted into said support for said protective device.

17. A hybrid circuit according to claim 16, wherein said plate is a ceramic substrate means.

* * * * *